Dec. 20, 1960  W. H. OSBORNE ET AL  2,965,125
APPARATUS FOR CONTROLLING THE PUMPING
OF FLUIDS IN A PIPELINE
Filed Oct. 29, 1958  5 Sheets-Sheet 1

INVENTORS:
W. H. OSBORNE
R. E. ZIMMERMAN
BY J. H. McCarthy
THEIR AGENT

Dec. 20, 1960  W. H. OSBORNE ET AL  2,965,125
APPARATUS FOR CONTROLLING THE PUMPING
OF FLUIDS IN A PIPELINE
Filed Oct. 29, 1958  5 Sheets-Sheet 2

INVENTORS:
W. H. OSBORNE
R. E. ZIMMERMAN
BY: J. H. McCarthy
THEIR AGENT

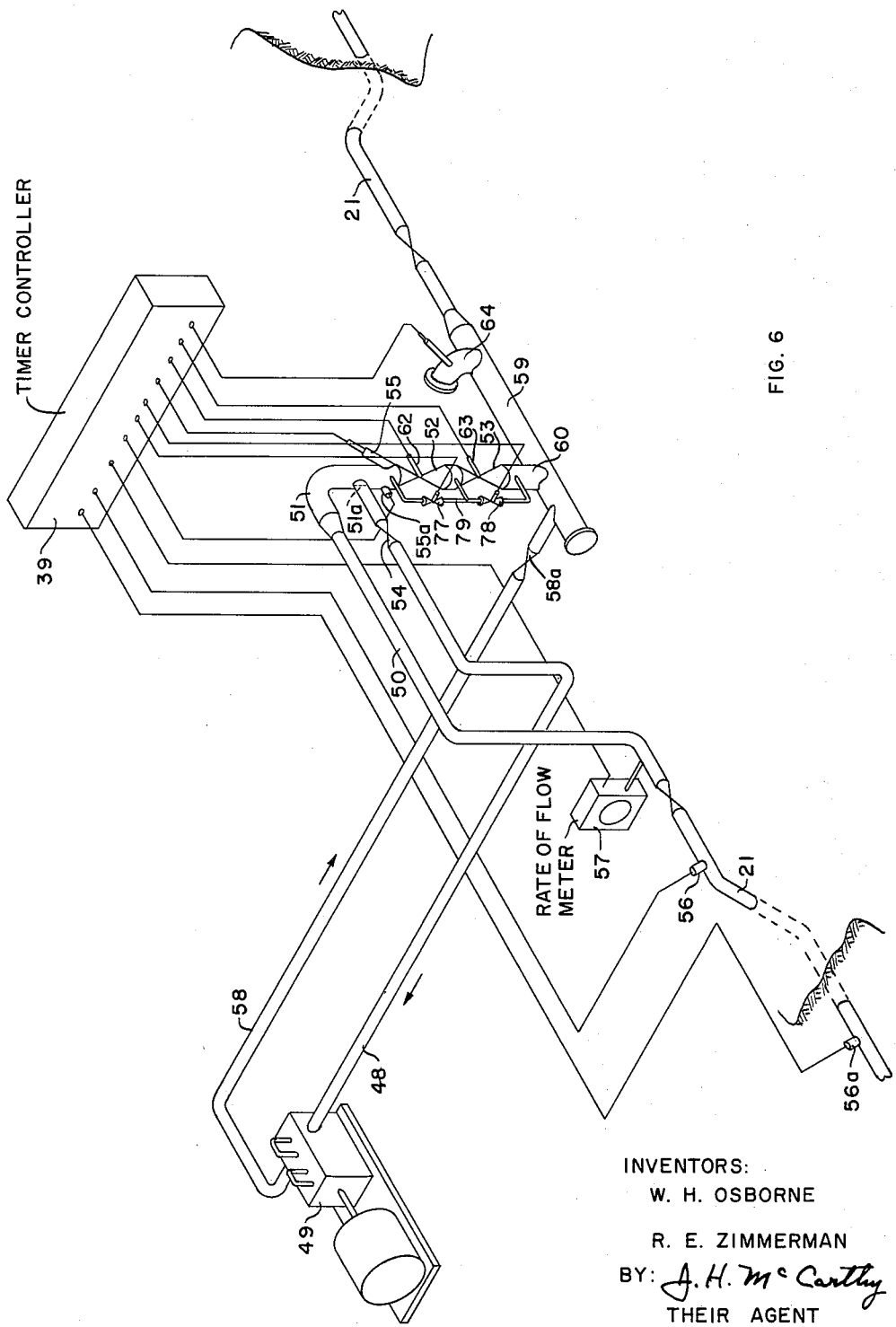

Dec. 20, 1960    W. H. OSBORNE ET AL    2,965,125
APPARATUS FOR CONTROLLING THE PUMPING
OF FLUIDS IN A PIPELINE
Filed Oct. 29, 1958    5 Sheets-Sheet 4

INVENTORS:
W. H. OSBORNE
R. E. ZIMMERMAN
BY: J. H. McCarthy
THEIR AGENT

Dec. 20, 1960 W. H. OSBORNE ET AL 2,965,125
APPARATUS FOR CONTROLLING THE PUMPING
OF FLUIDS IN A PIPELINE
Filed Oct. 29, 1958 5 Sheets-Sheet 5

INVENTORS:
W. H. OSBORNE
R. E. ZIMMERMAN
BY: J. H. McCarthy
THEIR AGENT

United States Patent Office 2,965,125
Patented Dec. 20, 1960

2,965,125

APPARATUS FOR CONTROLLING THE PUMPING OF FLUIDS IN A PIPELINE

William H. Osborne and Ralph E. Zimmerman, Indianapolis, Ind., assignors to Shell Oil Company, a corporation of Delaware Filed Oct. 29, 1958, Ser. No. 770,471

5 Claims. (Cl. 137—268)

This invention relates to the transportation of liquids through pipelines, and pertains more particularly to apparatus for separating or minimizing the intermingling of two different fluids being pumped through a common pipeline, one liquid following the other. The present apparatus is particularly suitable for use with pipelines used to transport different grades or types of crude petroleum or its refined products from oil fields to a petroleum refinery and on to distribution areas which may be several hundred miles away.

At present, it is the general practice, in operating petroleum pipelines, to pump large quantities ("slugs," "tenders" or "batches") of different fluids successively through a pipeline in the same direction. Inherent in the movement of multiple refined petroleum products through a pipeline is the commingling of the contiguous volumes as they move through the pipeline system. The volume of the admixture is commonly referred to as an interface, or as interfacial contamination, or as the interfacial mixture.

While theoretically the interface in a pipeline between two fluids such as kerosene and furnace oil should be a fairly well-defined line, in actual practice no such line exists but instead there is an interface which may be many feet in length and which may constitute a considerable volume of fluid. For example, the initial interface between two different refined petroleum products being pumped through a fourteen-inch pipeline may vary anywhere from ten to eighty barrels of fluid at the source of the pipeline. One cause of this large interface is due to the fact that the valves in lines from tanks containing the two different refined products cannot be simultaneously and instantaneously opened and closed. Even if the valve of one tank could be instantaneously opened while the valve of the other tank was instantaneously closed there would still be considerable intermixing of fluids after such an interface had passed through the normal pumping station piping and pump or pumps and as it starts its journey through the carrier pipeline.

An initial interface of say fifty barrels of commingled petroleum products may increase manyfold, frequently to from 10 to 20 times or more the original volume, by the time the two liquids have been pumped several hundred miles and have passed through the usual complement of pumping stations. It is the large volume of these liquid admixtures, upon arrival at the pipeline terminus, which has curtailed somewhat the scope and flexibility of this basic mode of refined product transportation. A more effective utilization of product pipelines systems depends upon the mitigation and control of the volume of product interfaces between transported fluids. Since the admixtures comprise contaminated portions of each of the products being pumped through a pipeline, the contaminated portions must be carefully and accurately removed and segregated at the pipeline terminus so that they do not contaminate the pure products delivered to storage tanks at that point. The admixed portions reduce considerably the capacity of a pipeline to transport pure products. In addition, a monetary loss is inherent in the admixtures as they generally must be reprocessed, blended or sold as a low grade product.

The technique of controlling the volume of commingled liquids between two different liquids in a pipeline is based on the following fundamental observations: Refined products moving in turbulent flow through a straight pipeline have, through a cross-sectional area of the stream, a range of velocities which vary from a maximum at the center of the pipeline to a minimum at the pipe wall. Interfacial mixing of refined products, which are moving contiguously through a pipeline, is primarily a function of the cross-sectional liquid velocity profile, the amount of molecular diffusion and the extent of eddy transport of the material in flow. An alteration of the characteristic liquid velocity pattern throughout the volume of the interface is necessary to achieve adequate control of an interfacial mixture.

A solid body, for example a plug, scraper, separator or go-devil, having an elastic surface in full contact with and pressing against the inside pipe wall, moves through the pipeline with a constant cross-sectional velocity. However, its velocity relative to the velocity of the pipeline stream is a function of the effectiveness of the seal which is maintained between the solid body and the pipe wall. A solid body cannot maintain an absolutely perfect seal with the pipe wall, hence cannot wipe all of the relatively slow velocity liquid from the pipe wall. The effect is a "flow back" of liquid across the body with the solid body moving forward relative to its initial position in the stream.

A solid body which maintains too tight a seal against the pipe wall is subject to an excessive pressure differential across its area of contact. Too tight a seal is accompanied by excessive wear of the solid body resulting in frequent breakdowns and failures, necessitating constant replacement of the solid body.

Solid bodies which maintain a constant positive seal with the pipe wall alter the characteristic cross-sectional liquid velocity pattern. The effect is to reduce liquid velocity differences in close proximity to the solid, maintaining an approximate uniform cross-sectional liquid velocity immediately in front and immediately in back of the solid. The liquid which is not immediately adjacent to the solid retains its characteristic cross-sectional velocity pattern with the resultant commingling characteristics.

Heretofore, many people have attempted to insert a solid plug into a pipeline flow stream between two liquids to force the stream to move forward at a uniform velocity across every cross-section so as to eliminate any intermixing of the interface of the two liquids. Since a single solid body can hold a uniform velocity only at one point, it cannot form an effective seal between two products in a pipeline as the products near the pipe wall do not normally move forward as rapidly as the product near the center of the pipe. Obviously, the efficiency of the single separating plug will be very low.

It has been shown in co-pending United States patent application Serial Number 689,804, filed October 14, 1957 to Harden that a plurality of movable solid bodies inserted in the interfacial volume within a pipeline at spaced intervals are far more efficient in preventing further intermixing of two dissimilar liquids than a single solid body. As it is impossible to move separating plugs of a solid nature such as spheres or spheroids through a pump(s) and its related piping at a pipeline pumping station, the separating plugs must be removed from the fluid prior to its passage through the pumps. During the passage of the two liquids through the pump without the separating plugs being present, an additional amount of commingling of the fluids may take place. In this event, one or more additional separating spheres or spheroids should be injected immediately behind the spheres to confine the interfacial volume of the flow stream downstream of the pump or alternately, to reinject the same number of spheres but at a greater interval of volume between each.

Equipment has been previously shown, in co-pending United States patent application Serial Number 690,012, filed October 14, 1957 to Osborne and Harden, and which has since matured into Patent No. 2,953,157, issued on September 20, 1960, to extract the separating spheres or spheroids from a flowing pipeline stream and later inject them into the pipeline downstream of a pumping station. While the apparatus employed by Osborne and Harden was efficient in maintaining a substantially constant volume of interfacial mixing by confining it between the extremities of the series of separating plugs, it required considerable manpower to handle the separating plugs at each pipeline pumping station where they had to be extracted from the scraper receiving barrel and later manually transferred to and inserted in a launching barrel downstream of said pump.

It is the primary object of the present invention to provide apparatus for controlling and holding to a minimum the interfacial volume between two different liquids being pumped consecutively through a pipeline which may have intermediate booster pumping stations between its source and terminus.

A further object of this invention is to provied apparatus for isolating or bracketing portion of an interfacial volume between two different liquids as they are being pumped through a pipeline, said apparatus including mechanical separating means or plugs and conduit means for bypassing the separating plugs from the upstream to the downstream side of a pumping station while at the same time passing the fluid in the pipeline through said pump.

Another object of the present invention is to provide apparatus for extracting a plurality of separating plugs or spheroids from the interfacial volume between two liquids in a pipeline prior to and/or during said volume passing through a pump, and subsequently reinserting said separating plugs at substantially the same relative position that they previously occupied in the interfacial volume, at a point downstream of said pump.

A further object of this invention is to provide pipeline apparatus for automatically bypassing objects in the flow stream around the pumps in successive pumping stations so that such objects are reinjected into the flow stream in the same relative position at each pumping station without the necessity of discontinuing the pumps' operation while such objects are passing them.

A further object of this invention is to provide apparatus for isolating or bracketing portions of an interfacial volume between two different liquids as they are being pumped through a pipeline, which apparatus additionally acts as signal means for automatically initiating any of many functions encountered in pipeline operations.

These and other objects of this invention will be understood from the following description taken with reference to the drawing, wherein:

Figure 6 is a diagrammatic view, taken in isometric projection, illustrating the necessary apparatus for removing the solid bodies of Figures 1 and 2 from the pipeline upstream of a pump station and for reinserting the solid bodies into the pipeline downstream of said pump station;

Figure 8:
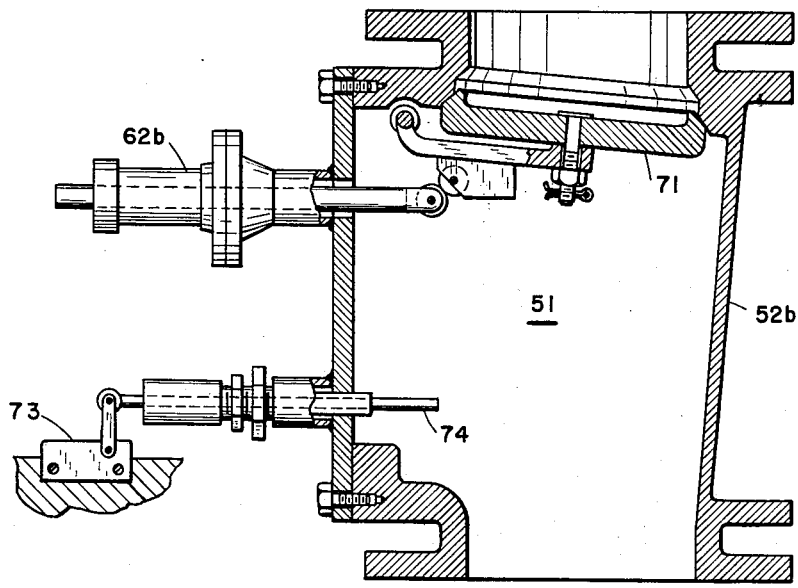
Figure 7:
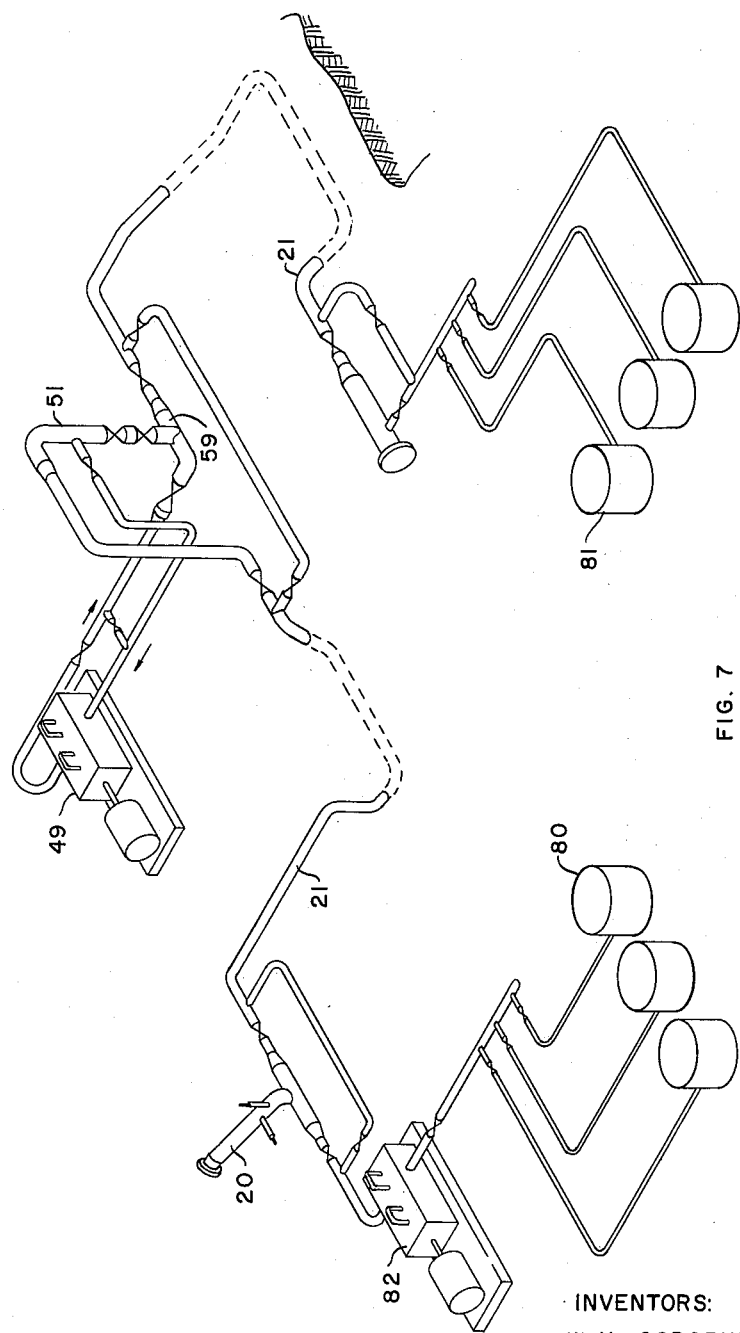
Figure 9:
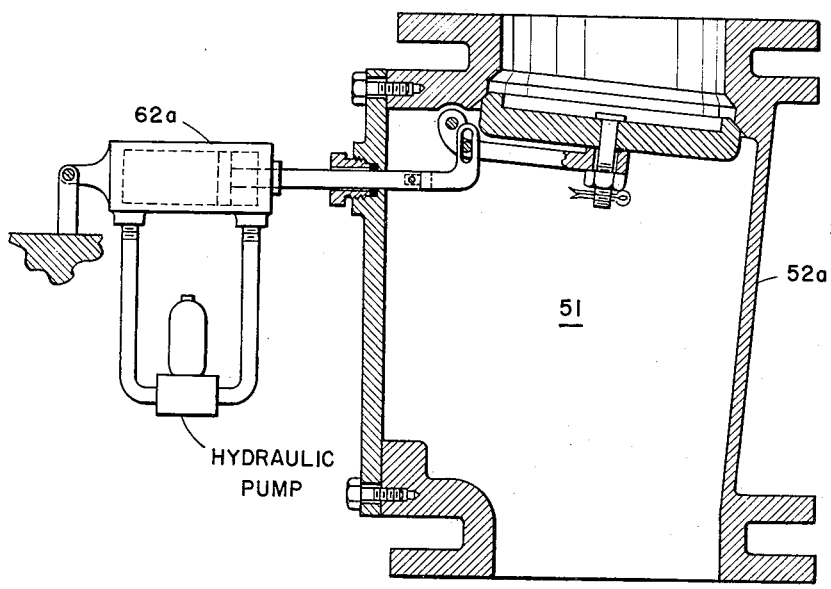

Figure 7 is a diagrammatic view illustrating a pipeline system equipped with apparatus for inserting solid bodies into the flow stream therein downstream of the initial pump station, removing them from the flow stream upstream of a second pump station, reinserting them in the flow stream downstream of the second pump station and finally stopping them and permitting their removal at the terminus of the line;

Figure 8 is a cross-sectional view in an enlarged detail of one type of full-opening and quick-closing valve which may be used with the present invention; and Figure 9 is a cross-sectional view of another type of full-opening and quick-closing valve which may be used with the present invention as an alternate to the type shown in Figure 8.

As described in co-pending United States patent applications Serial No. 689,804, filed October 14, 1957 to Harden, and Serial No. 690,012, filed October 14, 1957 to Osborne et al., a method of isolating an interfacial volume at the source of a pipeline or maintaining at a substantially constant value the interfacial volume already formed in a pipeline between two different liquids being pumped consecutively without any stoppage of flow through said pipeline comprises, positioning a plurality of solid bodies in spaced relationship throughout the length of said interfacial volume so that the effect is to move the total interfacial volume through the pipeline system at an approximate uniform cross-sectional velocity.

Figure 1:
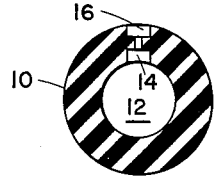
Figures 1 and 2 are solid bodies of a type to be employed with the apparatus of the present invention.
Figure 2:
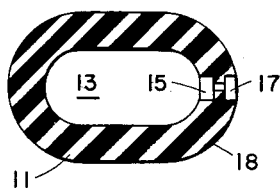

The solid bodies employed in practicing the present method, may be in the form of plugs or short dumbbell-type scrapers but, for ease in handling, are preferably in the form of spheres or spheroids, as illustrated in Figures 1 and 2. While the sphere 10 of Figure 1 and the spheroid 11 of Figure 2 may be solid bodies, they are preferably formed with a cavity or hollow core 12 and 13 which are closed by means of valves 14 and 15. Recessed portions 16 and 17 are formed in the wall of the members 10 and 11 so that the valves 14 and 15 will not be damaged as the outer surface of the solids 10 and 11 wears away in its travel through a pipeline. The cavity or hollow core 12 and 13 can be filled with a solid sphere of non-elastic material which is inserted during the molding process and remains during the life of the sphere or spheroid or such a cavity may be more preferably filled with a suitable liquid hydrocarbon or water.

The solid bodies, such as the sphere 10 and spheroid 11, are preferably made of rubber, either synthetic or natural, or a combination thereof, or a plastic material, either material being of a suitable hardness and elasticity and the walls of sufficient thickness to give sufficient structural strength to the sphere so as to maintain a tight fit, hence a good seal, against the pipe wall while passing through the pipeline. At the same time it is preferred that the spheres be made of a material that is slightly resilient so that the sphere can be inflated and expanded slightly to the desired diameter. For example, it has been found that a spheroid that travels about four hundred miles through the fourteen-inch pipeline becomes a quarter of an inch smaller in diameter by the end of its travel. Prior to reinserting the spheroid into the pipeline it is inflated slightly so that it again has its original diameter. The spheres and spheroids are preferably inflated with a noncompressible liquid, such as for example, water. At times it may be desirable to use a liquid lighter than water to reduce the weight of the spheroid and make it more nearly equal to that of the fluid being pumped through the pipeline. During the winter season in northern areas the spheroids are filled with a liquid that will not freeze, for example a 50–50 mixture of water and ethylene glycol, or with any suitable petroleum product. In the case of spheres or spheroids employing solid cores, liquid can be forced into the interstice between the solid cores and the elastic body.

The cross-sectional diameter of the spheres and spheroids is critical and must be maintained. This is done by reinflating the spheres and spheroids from time to time as they become worn during their travel through the pipeline. The diameter of the spheres and the minor axis of the spheroids should be slightly greater than the inside diameter of the pipeline through which they are to travel. If the diameter of a sphere or the minor axis of a spheroid is too great, it will pass through the pipeline with too much frictional resistance and there will be excessive wear on its outer surface. On the other hand if the diameter of the sphere or the minor axis of the spheroid is too small, a poor seal will be established between the sphere or spheroid and the wall of the pipe so that there is inadequate wiping of the pipe wall and excessive "flow back" of liquid across the sphere or spheroid will result. When no physical contact at all is provided between the exterior of the sphere or spheroid and the interior of the pipe or when the sealing surface of the sphere or spheroid breaks down or is damaged, "flow forward" of liquid across the sphere or spheroid will result.

The optimum size for the sphere or the minor axis for the spheroid must be determined for the particular inside pipe diameter. It was found that the optimum diameter of a sphere or the minor axis of a spheroid to be used in a certain fourteen-inch pipeline should be between thirteen and seven-sixteenths and thirteen and five-eighths inches.

The length of the substantially-flat portion 18 formed or allowed to wear on the spheroid 11 of Figure 2 is not too critical but is dependent on the increased sealing area desired or needed to separate effectively two liquids of considerably different gravities. Spheroids are superior to spheres in one respect in that the flat portions 18 of a plurality of spheroids provide a better wiping action on the inner wall of the pipeline, thus tending to better remove the preceding liquid therefrom.

Figure 4:
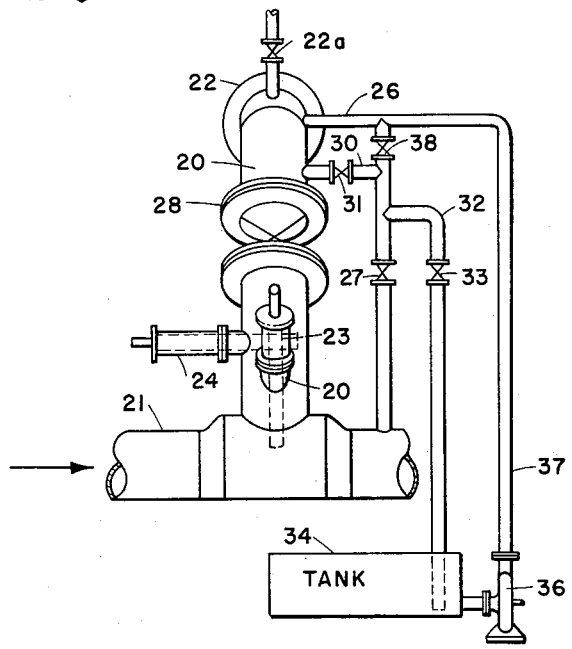
Figures 3 and 4 are side and end views, respectively, of apparatus for initially launching the solid bodies of Figures 1 and 2 into a pipeline, or for launching additional solid bodies into or behind an interfacial volume bracketing series of bodies as they bypass the pump of a pumping station.
Figure 3:
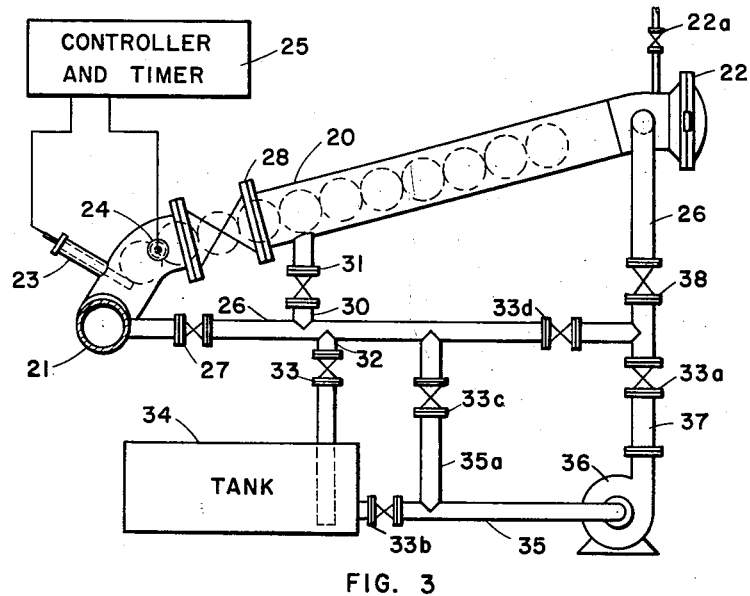

Since it is contemplated to place at least two, preferably three, and often as many as ten or more spheres or spheroids in the interface volume between two liquids moving through a pipeline, an apparatus is provided as shown in Figures 3 and 4 for originally launching or inserting these spheres or spheroids into a pipeline at a predetermined rate so that the spheres are in spaced relationship when they are propelled through the pipeline. The sphere-launching apparatus comprises a slightly oversize section of pipe 20 secured to valve 28 and, with valve 28 open, in open communication with the carrier pipeline 21. As illustrated in Figures 3 and 4, the launching pipe 20 is positioned above the carrier pipeline 21 in such a manner as to allow the spheres or spheroids to fall or roll into the main carrier line 21. The launching pipe and the main carrier line at the point of introduction of the spheres are sufficiently larger than the spheres or spheroids to allow their free movement under the effect of gravity. An angle of 15° above the horizontal has been selected so that the loading end of the launching pipe is low enough for ease in loading spheres into it, but such a slope is not critical so long as the spheres can roll or fall in the launcher. The loading end of the launching pipe is closed in a fluidtight manner by any suitable cover 22. Valve 28 is provided in the lower end of the launching pipe 20 to provide a means of isolating the launching pipe 20 from the main carrier pipe 21 to enable loading spheres into the launching pipe 20 without interrupting liquid flow through the main carrier pipe 21.

Fixedly secured to the launching pipe 20 near the launching end thereof are suitable launching control devices comprising, for example, piston operated insertable and retractable plungers whereby one sphere at a time may be released into the main pipeline 21. As shown in Figure 3 the launching apparatus is supplied with two pistons 23 and 24 mounted on the top and side, respectively, of the launching tube 20 and extending thereinto. In this case two pistons are used, one piston 23 acting to control the time of actual release of the lowest sphere or spheroid into the carrier pipe 21 while the other piston 24 acts as the "hold" piston, preventing more than one sphere from rolling. Both pistons 23 and 24 may be operated manually but are preferably connected to an automatic controller and timer for actuating the pistons either electrically, pneumatically, hydraulically or mechanically.

In operation, the "release" piston 23 is raised every time it is desired to drop a sphere into the pipeline 21. At the same time "hold" piston 24 holds the rest of the spheres 10 in the launching tube 20 from rolling downward. After moving piston 23 so that it extends into the launching tube 20 again, the "hold" piston 24 is retracted completely and then reinserted so that another sphere rolls past it to be positioned against "release" piston 23.

A bypass line 26 is connected between the main carrier pipeline 21 and the loading end of the launching tube 20. With valves 27, 33d and 38 in said line open and valves 31, 33, 33a and 33c closed, a small portion of fluid will be circulated from the main pipeline 21, up through the launching tube 20, thence through conduit 26, permitting the fluid in the tube 20 to be continually changed so that it will be at all times the same as the fluid in the main carrier pipeline 21. Additionally, a short conduit 30 is provided on the under side of 20 and above valve 28 in communication between the lower end of the launching tube 20 and conduit 26, said conduit 30 having a valve 31 therein. Conduit 26 is also connected by means of a conduit 32 and valve 33 to a sump tank 34. Pump 36, through suction line 35 is connected to the bottom of the sump tank 34 and to the carrier line side of conduit 26 by line 35a with valve 33c therein and the pump discharge line 37 with valve 33a therein is in communication with conduit 26 so as to permit pumping fluid from the sump tank 34 to the main carrier line 21, to the launching tube 20 or to circulate carrier line liquid through the pump to the launching tube.

Thus, when it is desired to load more spheres into the launching tube 20, valves 27 and 28 are closed and valves 31, 33, and 22a are opened to allow fluid in the launching tube 20 to drain into the sump tank 34. The fluidtight cover 22 is then removed from the launching tube 20 and additional spheres are inserted into the tube. After closing cover 22, valves 33c, 33d, and valve 31 and opening valves 33a, 33b and 38, pump 36 is started to return the fluid from the tank 34 into the launching tube 20. After the launching tube is filled with liquid, valve 22a is closed, valve 28 is opened and the fluid evacuated from the sump tank 34. The pump is then turned off, valves 27, 33d, and 38 are opened, 31, 33, 33a, and 33c are closed and the system is ready for operation.

Pressure differential in the carrier pipeline arising from the change in pipe diameter at the introduction point in combination with the pressure drop at the throat of the reduced pipe size will normally be sufficient to displace liquid from the launching barrel, through conduit 26 and valves 38, 33d, and 27, back into the main carrier line. In the event that a rapid displacement rate is desired for the fluid in the launching tube 20, it is possible to close valves 33, 33b, 33d, and 31 and open valves 33c and 33a and pump fluid from the main line through valve 27 to the top of the launching tube 20 and thence through the launching tube to the main line.

The shape of the spheres and spheroids facilitates their handling in the launching apparatus and their insertion into the pipeline 21. In order that spheroids may roll in the launching barrel, they are inserted therein with their major axis transverse to the launching barrel. The spheres and spheroids roll readily and do not hang up on any obstructions in the launcher or the pipeline. The equipment can be modified, if desired, to handle short cylindrical plugs or scrapers.

Figure 5:
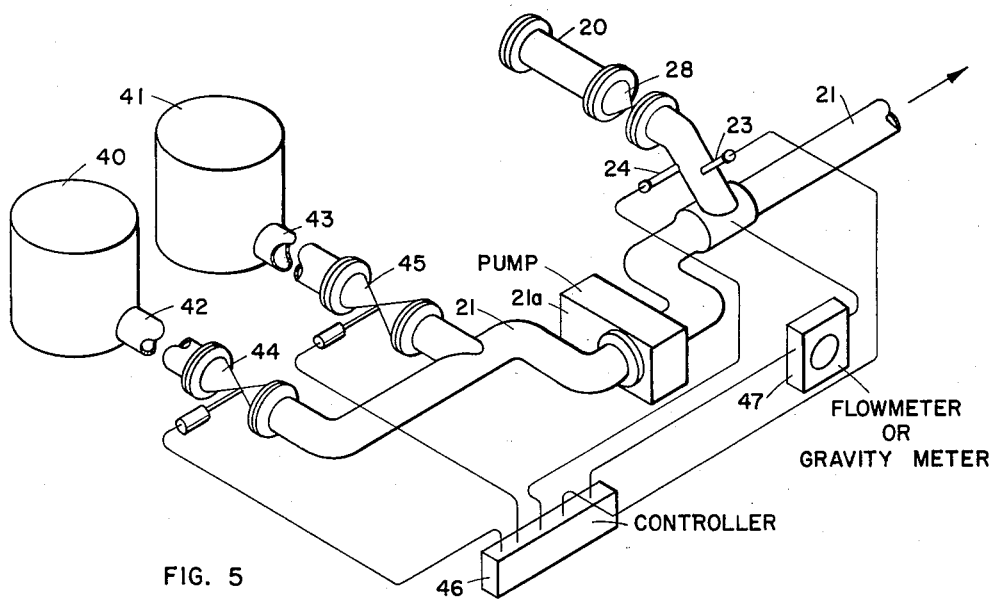
Figure 5 is a diagrammatic view illustrating the launching apparatus of Figure 3 mounted on a pipeline at its source which is in communication with at least two storage tanks containing fluids of different composition.

In Figure 5, two storage tanks 40 and 41 are shown as being connected by means of conduits 42 and 43 to a pump 21a and a main pipeline 21. The two tanks 40 and 41 contain different liquids, for example fuel oil and kerosene, respectively. The conduits 42 and 43 are equipped with valves 44 and 45 which are connected through a controller 46 which also controls the action of the pistons 23 and 24 in the launching tube 20. The system is provided with a suitable flow meter which is operatively connected to the pipeline 21 downstream of said pump 21a and upstream of said launching tube 20. The flow meter 47 is adapted to measure the quantity of fluid delivered initially to the pipeline. Preferably the flowmeter is of the type known as a "pre-set" or "pre-determining register" flowmeter on which a volume figure may be set. After a volume of fluid equal to that figure has passed through the meter, the meter is adapted to create or initiate an electrical signal which may be used to open or close a valve or to perform any other function. If desired, a gravity meter, capacitance cell, refractive index device or a radioactive tracer indicator may be adapted to measure a change in physical properties of the fluid in the pipeline at the launching tube 20 which change indicates a change in the composition of the fluid being pumped through the pipeline.

For example, if valve 45 was open so that a quantity of kerosene was being delivered into pipeline 21, at the end of this delivery of a predetermined volume of kerosene the controller 46 would automatically close valve 45 in conduit 43 and open valve 44 in conduit 42 thus starting a delivery of a quantity of fuel oil from tank 40 into pipeline 21. Pump 21a normally continues to operate at a reasonably constant pumping rate during the transition from kerosene to fuel oil through the carrier line. Valves 44 and 45 require an appreciable period of time to complete their opening and/or closing and in pipeline operations the closing of valve 45 would normally be conducted simultaneously with the opening of valve 44 so as to prevent a stoppage of flow through the pump. Commingled liquid is then generated from the time the two valves commence their transition until after the valves have completed their transition and the pump suction header, piping and pump itself have been purged of residual pockets of the previously pumped kerosene. It is the function of the devices of Figure 5 to launch a spheroid into the carrier line at the head end of the interfacial mixture, as many spheres as desired and at the spacing desired during the passage of the interfacial mixture, and finally a sphere at the tail end of the mixture, in this manner bracketing the mixture from the pure liquids on either end of it and separating it into segments. If pipeline 21 is a fourteen-inch pipe, the interfacial volume may be in the order of from ten to sixty barrels of liquid or even more depending on the piping scheme. When a volume of product equal to the volume of product contained between valve 44 and launcher tube 20 has passed the flow meter 47, a signal is transmitted by the flow meter 47 to the controller 46 which then actuates pistons 23 and 24 to release a sphere in the first portion of the interfacial volume and to position another sphere ready for releasing. If a gravity meter is employed, it can be used to detect the start of the interfacial mixture at the point of the launcher 20 and actuate controller 46. The controller 46 may be provided with a time delay mechanism so as to delay the launching of the first sphere in the pipeline 21 until the desired part of the interfacial volume is adjacent the launching tube 20. The time delay between the launching of the first spheroid and the time at which the first break in gravity passes the gravity meter is a function of the velocity of the stream.

Alternatively, instead of employing a flow or gravity meter, to measure a condition of the flowing fluid in the pipeline system, i.e., to measure and indicate the arrival of an interfacial volume in the flow stream, the controller with its time delay mechanism may be set to actuate pistons 23 and 24 a certain number of seconds after valve 45 has been closed and valve 44 opened. In this case the time delay between the launching of the first spheroid from the launching tube 20, and the opening of valve 44 with the simultaneous closing of valve 45, would be a function of the total volume of fluid between valve 44 and the launching tube 20 as well as being a function of the velocity of the liquid stream in the pipeline 21. Thus, to employ this time method of launching spheres, the flow rate in the pipeline must first be measured or known, and the volume of liquid between the launching tube and valves 44 and 45 must be known.

The desired number of remaining spheres or spheroids in the launching tube 20 are then automatically launched at predetermined time or volume intervals, the duration of which depends upon the total amount of interfacial mixture and the spacing in feet or volume desired between the individual spheres as they pass through the pipeline and/or upon the rapidity with which the automatic station bypass, to be described hereinbelow is designed to function. For example, where the interfacial volume between two products is fifty barrels and it is desired to have spheroids placed in this volume at ten-barrel intervals, a total of five spheres would have to be launched into the pipeline. The number of spheres or spheroids to be employed in any interfacial volume depends upon the piping system of each individual pumping station, the compatibility or ease with which two products mix when pumped next to each other through a pipeline and the degree of protection against increased mixture desired. Preferably, at least two spheroids must be launched into any interfacial volume and as many as ten or more may be employed in some circumstances with certain liquids. In certain systems it is desirable to employ unequal spacing between several spheres. For example, where gasoline precedes fuel oil, it may be desirable to launch the preponderance of spheroids near the tail end of the original mixture volume in order to provide the greatest protection for the fuel oil. By the same token, where fuel oil precedes gasoline it may be desirable to launch the preponderance of spheroids near the head end of the original mixture volume in order to provide the greatest protection for the fuel oil.

Since it is desired to keep the spheres or spheroids moving in the same relative position within the interface for the entire length of the pipeline along which one or more pumping stations may be located, an apparatus is provided as shown in Figure 6 for receiving the spheres or spheroids, delaying their travel long enough for the fluid interface to travel through the pump and station piping, and reinserting them in the pipeline at the same point in the fluid interface that they arrived. The sphere-pump-bypass apparatus comprises an elevated conduit 50 tied to an oversize sphere-separating and holding chamber 51 connected through a valve 54 to suction line 48 of a pump 49. A curved sphere-deflector plate may be positioned at the junction of any pair of pipes to aid the spheres in turning a corner. If spheroids or other solid bodies are used it is necessary to employ a pipe of enlarged diameter at any turning point. At the bottom of the sphere separating and holding chamber 51, full-opening and oversize valves 52 and 53 are connected in series with sufficient space between them to hold not less than one sphere 10 or spheroid 11. The sphere separating and holding chamber 51 and the valves 52 and 53 are large enough to allow the spheres or spheroids to fall or roll free through them whenever it is desired to move the spheres or spheroids progressively through this portion of the pipeline. A suitable grid of steel rods at the entrance to pump suction line 48 may be employed if necessary to prevent the spheres or spheroids from entering this latter line.

The gate valves 52 and 53 are equipped with valve operators 62 and 63 which are operatively connected to and controlled by the timer control 39. These valve operators 62 and 63 may be operated either electrically, pneumatically, hydraulically or mechanically, but they are all preferably actuated by an electric signal from the timer controller 39. Depending upon the precise arrangement of the valves employed with the present system, the valve operators 62 and 63 are power-operated in both directions. For example, when the power-actuated valve operators 62 and 63 are connected to valves 52 and 53 which are of the gate type, it would be necessary to employ double-acting valve operators 62 and 63 to open and close such gate valves upon electrical signal. Alternately, if two flapper-type valves 52a and/or 52b of the type shown in Figures 8 or 9 are employed instead of gate valves 52 and 53 so that they permit the passage of a sphere vertically downward, double-acting valve operators 62a and 62b could be employed to open and close valves 52a and 52b by means of a suitable externally mounted piston and crank as shown in Figures 9 and 8, respectively.

Alternatively, a full-opening valve 52b (Figure 8) of the flapper type could be employed with the flapper 71 being allowed to fall to an open position by gravity, and subsequently being forced to a close position by the power-actuated valve operator 62b. If desired, the valve of Figure 8 may be provided with a micro-switch 73 having an actuating rod extending into the valve casing. By connecting the micro-switch 73 to the timer controller 39 a signal would be provided for indicating when the flapper valve 71 was in an open position.

When valves 52a and 52b are of the type illustrated in Figures 6, 8, and 9, the pressure across them must be equalized in order that they may be opened with either a power operator or by gravity. One means of accomplishing this is to provide a pair of valves 77 and 78 in a pressure equalizing line 79 which is in communication with chamber 51 upstream and downstream of each of the valves 52a and 52b. The valves 77 and 78 may be of the solenoid operated type but are preferably of the plug or gate type mechanically operated electrically, pneumatically or hydraulically, in any case actuated by electrical signal from the timer controller in the proper sequence. Thus, in considering the transistion of a sphere or spheroid from the low pump suction pressure area of chamber 51 upstream of valve 52a to the high pump discharge pressure area 60, valve 77 is first opened, equalizing the pressure across valve 52a whereupon it may be easily opened and then closed during which operation the sphere falls vertically through it and stops on top of valve 52b. Valve 78 may then be opened, equalizing the pressure across valve 52b whereupon the latter may be easily opened and then closed during which operation the sphere falls vertically through it, thence through 60 to 59 where it rejoins the flowing stream from pump discharge line 58 and is forced on downstream with it into the carrier pipeline 21.

In certain systems, while pumping certain types of fluid, the interfacial mixture between the fluids increases as the fluids pass through a pump so that it may be desirable to add one or more extra spheres or spheroids in the interfacial volume after the last of the mixture bracketing spheres has progressed through valve 52b of any given pumping station on a pipeline. In order to accomplish this, and referring to Figure 6 of the drawing, an extra spheroid launching device 64 is diagrammatically shown which may be identical to the launching tube 20 shown in Figures 3 and 4 which has automatically-actuated holding pins 23 and 24 therein which are actuated either manually or by the timer-controller 39. The ball launcher 20 is provided with a removable cover 22 which may be opened to insert manually the spheres or spheroids which are held in reserve by the retractable pin 23.

A complete system according to the present invention is illustrated in Figure 7 wherein fluid stored in any one of a plurality of tanks 80 is pumped via pipeline 21 to a tank farm 81 many miles away. Assuming that the pipeline 21 is full of gasoline, it is now desired to pump fuel oil from one of the tanks 80 through pipeline 21. The fuel oil is run from its storage through the initial mainline pump 82. As described with regard to Figure 3 of the drawing, as the interfacial mixture between the gasoline and fuel oil passes the spheroid launcher 20 downstream of the pump 82 a plurality of spheres or spheroids or other bodies are dropped into the pipeline at predetermined intervals so that there is a predetermined volume of fluid between the spaced solid bodies and in such a manner as to bracket or trap the mixture between the first and final bodies. The spacing between the solid bodies may be equal or unequal, as desired.

As the interfacial volume of mixed gasoline and fuel oil arrives at the first intermediate booster station the spheres or spheroids are caught in the chamber 51 while the fluid passes through the booster pump 49 and the interfacial volume is discharged from the pump and passes through the barrel 59. The spheres, as they drop into the chamber 51, are automatically sequenced through the dual valves and dropped into the flow stream in the same relative location and at the same spacing at which they arrived at the pump station and were removed from the flow stream.

Referring to Figure 6, the detailed operation of the apparatus is as follows: The pump 49 is operating, valves 52 and 53 are closed and the sphere holding pin 55 is withdrawn so that the first sphere which arrives will fall onto the closed gate of valve 52 as the liquid stream is diverted through valve 54 and line 48. The holding pin 55 is reinserted to hold back a subsequent sphere or spheres as they arrive so that only one sphere drops through valve 52, when it is opened, to rest on the gate of valve 53. Valve 52 is then closed, and the sphere or spheroid is ready to be dropped into conduit 60. When valve 53 is opened the sphere or spheroid drops or rolls into conduit 60. Valve 53 is then closed.

The pump discharge conduit 58 is connected through a valve 58a to a section of conduit 59 with a diameter larger than the pipeline diameter. Conduit 60 communicates with conduit 59 downstream from the pump discharge connection 58 so that any sphere or spheroid which enters conduit 60 will fall or roll into conduit 59 and thus re-enter the pipeline stream and be propelled into the carrier line 21. Holding pin 55 and valves 52 and 53 may be operated manually but are preferably connected to the automatic controller 39 which senses the sphere arrival with a scraper indicator 55a of any suitable type and actuates the holding pin 55 and operates valves 52 and 53 in the proper sequence and with the appropriate time delay to insure correct location of the spheres or spheroids in the discharge stream. The valves and controller are arranged to insure that valve 52 is completely closed whenever valve 53 is opened and that valve 53 is completely closed whenever valve 52 is opened since the hydraulic pressures in conduit 60 are higher than the hydraulic pressures in the holding chamber 51, hence would cause fluid flow in a direction opposite to the desired direction of travel for the sphere.

The present apparatus is provided with controls and valves that make it completely automatic in operation and capable of moving a sphere from the holding chamber 51 to the discharge conduit 59 during a time interval equal to the time required for the fluid to pass from suction entrance 51a, through suction line 48, pump 49, discharge line 58 to the junction of conduits 59 and 60. In this manner a spheroid is restored to the flowing stream in the same relative position from which it was intercepted at point 51a. Suitable scraper indicator means 56a and 56 are provided for sensing the arrival of each of the several spheres, the time required for each spheroid to displace a volume equal to the station piping and transmitting separate signals to the timer-controller 39. These time intervals are used by the controller to assure that each spheroid is returned to the fluid stream at the same point from which it was removed from the stream.

Alternately, a rate of flow meter 57 may similarly be provided to transmit a signal to the timer-controller 39 which is proportional to the rate of flow or the rate at which the spheres are travelling at the time of their arrival. The timer-controller 39 is provided with suitable time memory devices which accumulate the elapsed spheroid travel time between indicator 56a and indicator 56 so that a corresponding volume of fluid can pass through the station after the arrival of each sphere before that sphere is reinjected into the stream downstream of the station.

Provision may be made in the timer-controller 39 and the electrical circuitry of a pumping station so that, in the event pump 49 at any particular station on a pipeline is caused to cease operation while other pumps on the pipeline continue their operation, valves 52 and 53 or valves 52a and 52b may be manually or automatically opened to permit flow of fluid through the station site without such fluid passing through the pump 49. When this condition exists at a pumping station, any spheres or spheroids which may come through the pipeline into the station site are propelled directly through the open valves 52 and 53 with the fluid. When such an inoperative pump is activated to commence pumping, the valves 52 and 53 may be manually or automatically moved to their closed position.

In pipeline operations, the present apparatus for minimizing the interfacial volume between two different petroleum products in a pipeline was found to be far more efficient than any other type of previously known apparatus. A single scraper of the type shown in U.S. Patent 1,966,819 to J. L. Irvin, which was issued July 17, 1934 was tested to determine its efficiency in separating two different liquids in a pipeline. The scraper was modified in that it was thirty-six inches long and was provided at each end with five pairs of soft rubber disks, each pair spaced about an inch from the adjacent pairs. The device was subject to frequent breakdowns and was very heavy weighing over two hundred and fifty pounds. When used in a fourteen-inch diameter pipeline between range fuel and premium grade motor gasoline over a seventy-six mile distance, the interfacial volume between these two liquids on either side of the scraper increased one hundred sixty barrels in volume.

In another test a pair of dumbbell-type scrapers having a two-disk unit at each end of the scraper and being thirty-six inches long were used between kerosene and gasoline and the volume thereof increased one hundred eighty barrels over a seventy-six mile run. On the other hand, when five spheroids were launched at spaced intervals in this same fourteen-inch pipeline in accordance with the present invention there was only a forty barrel increase in the interfacial volume between gasoline and burning oil over a seventy-six mile run. Without any spheroids in the same type of an interface, the volume thereof increased two hundred thirty barrels.

In a further test to determine the necessity of spacing the spheres in a pipeline, four spheres were launched simultaneously in a pipeline at the first break of an interfacial volume and again the interfacial volume increased one hundred sixty barrels.

We claim as our invention:

1. Apparatus for use with a pipeline system to bypass a solid object moving through said pipeline around a pumping station in said pipeline, said apparatus comprising a pipeline, a solid body insertable in said pipeline to pass therethrough, a pumping station having intake and discharge pipelines, openings in said intake and discharge pipelines of a size to permit the passage of said solid body through the openings, said solid body being circular in at least one cross-sectional plane and having a diameter substantially equal to that of said pipeline, a bypass conduit connecting said openings in said intake and discharge pipelines, said bypass conduit having a diameter slightly greater than said solid body to permit said solid body to pass readily therethrough, a pair of normally-closed valves in said bypass conduit, said valves being arranged in spaced relationship to permit said solid body to be positioned between said valves when both valves are closed, and means for selectively opening said valves one at a time.

2. Apparatus for use with a pipeline system to bypass a solid object moving through said pipeline around a pumping station in said pipeline, said apparatus comprising a pipeline, a solid body insertable in said pipeline to pass therethrough, a pumping station having intake and discharge pipelines, openings in said intake and discharge pipelines of a size to permit the passage of said solid body through the openings, said solid body being circular in at least one cross-sectional plane and having a diameter substantially equal to that of said pipeline, a bypass conduit connecting said openings in said intake and discharge pipelines, said bypass conduit having a diameter slightly greater than said solid body to permit said solid body to pass readily therethrough, a pair of full-opening hinged gate valves installed in said bypass conduit and arranged to open when no differential pressure exists across them, valved pressure conduit means in communication with points upstream and downstream of each of said gate valves for selectively equalizing the pressure across each valve, power-actuated means for selectively closing each of said valves, and controller means operably connected to said valved pressure conduit means and said power-actuated means.

3. A pipeline system for transporting successive batches of different liquids wherein control is maintained on the interfacial volume formed in a flow stream between two liquids of different physical properties being pumped successively through said pipeline system, said system comprising a main pipeline having multiple pumping stations, conduit means for introducing a first and second liquid into said pipeline whereby an interfacial volume is formed between the two liquids, a plurality of solid bodies having a diameter slightly greater than said pipeline before insertion in said pipeline and being circular in at least one cross-sectional plane, first launching means in communication with said main pipeline downstream of said conduit means for inserting into the interfacial volume within said pipeline said plurality of solid bodies in spaced relationship with each other, said solid bodies forming movable partitions in said flow stream bracketing portions of said interfacial volume, at least one of said pumping stations in said pipeline being intermediate the ends thereof, said pumping station having intake and discharge pipelines forming part of said main pipeline, second launching means sloping downwardly and having an outlet in communication with said pump discharge pipeline for inserting said solid bodies on the downstream side of said pumping station, a bypass conduit in communication between the pump intake pipeline and the raised end of said second launching means, a pair of full-opening valves in spaced relationship in said second launching means, and means for actuating said valves successively and independently whereby said solid bodies move by force of gravity through first one valve and then the other as they are opened.

4. A pipeline system for transporting successive batches of different liquids wherein control is maintained on the interfacial volume formed in a flow stream between two liquids of different physical properties being pumped successively through said pipeline system, said system comprising a main pipeline having multiple pumping stations, conduit means for introducing a first and a second liquid into said pipeline whereby an interfacial volume is formed between the two liquids, a plurality of solid bodies having a diameter slightly greater than said pipeline before insertion in said pipeline and being circular in at least one cross-sectional plane, first launching means in communication with said main pipeline downstream of said conduit means for inserting into the interfacial volume within said pipeline said plurality of solid bodies in spaced relationship with each other, said solid bodies forming movable partitions in said flow stream bracketing portions of said interfacial volume, at least one of said pumping stations in said pipeline being intermediate the ends thereof, said pumping stations having intake and discharge pipelines forming part of said main pipeline, second launching means sloping downwardly and having an outlet in communication with said pump discharge pipeline for inserting said solid bodies on the downstream side of said pumping station, a bypass conduit in communication between the pump intake pipeline and the raised end of said second launching means, a pair of full-opening valves in spaced relationship in said second launching means, means for actuating said valves successively and independently whereby said solid bodies move by force of gravity through first one valve and then the other as they are opened, and means at the terminus of said pipeline for removing said solid bodies therefrom.

5. A pipeline system for transporting successive batches of different liquids wherein control is maintained on the interfacial volume formed in a flow stream between two liquids of different physical properties being pumped successively through said pipeline system, said system comprising a main pipeline having multiple pumping stations, conduit means for introducing a first and a second liquid into said pipeline whereby an interfacial volume is formed between the two liquids, a plurality of solid bodies having a diameter slightly greater than said pipeline before insertion in said pipeline and being circular in at least one cross-sectional plane, first launching means in communication with said main pipeline downstream of said conduit means for inserting into the interfacial volume within said pipeline said plurality of solid bodies forming movable partitions in said flow stream bracketing portions of said interfacial volume, at least one of said pumping stations in said pipeline being intermediate the ends thereof, said pumping station having intake and discharge pipelines forming part of said main pipeline, second launching means sloping downwardly and having an outlet in communication with said pump discharge pipeline for inserting said solid bodies on the downstream side of said pumping station, a bypass conduit in communication between the pump intake pipeline and the raised end of said second launching means, a pair of full-opening valves in spaced relationship in said second launching means, valve actuating means for actuating said valves successively and independently whereby said solid bodies move by force of gravity through first one valve and then the other as they are opened, rate of flow measuring means in communication with the intake line of said pumping station, indicator means on said pipeline upstream of said pumping station for indicating the arrival of solid bodies, and controller means including timing means operatively connected to said rate of flow measuring means and said indicator means and to said second launching means and said valve actuating means, whereby said solid bodies are reinserted by said second launching means into said pipeline at measured time intervals.

References Cited in the file of this patent
UNITED STATES PATENTS

| | | |
|---|---|---|
| 2,685,685 | Lothrop | Aug. 3, 1954 |
| 2,698,363 | Rush | Dec. 28, 1954 |
| 2,729,839 | Holt | Jan. 10, 1956 |
| 2,796,878 | Atkinson | June 25, 1957 |